J. P. BRADFORD.
PLANTER ATTACHMENT FOR CULTIVATORS.
APPLICATION FILED NOV. 1, 1911.
1,037,724.
Patented Sept. 3, 1912.
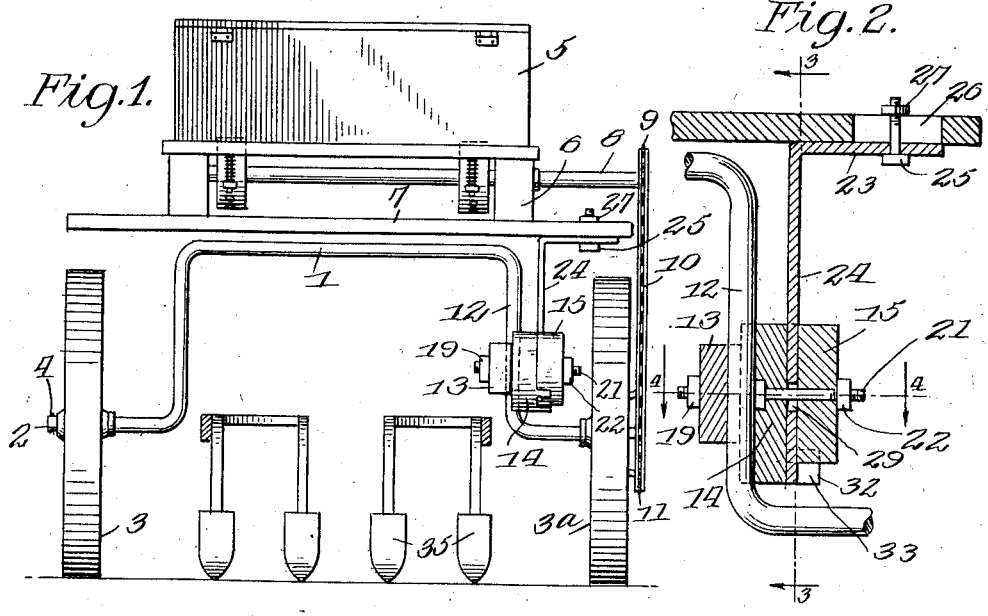
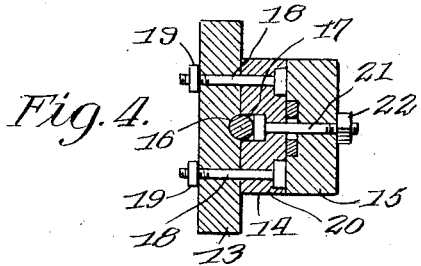
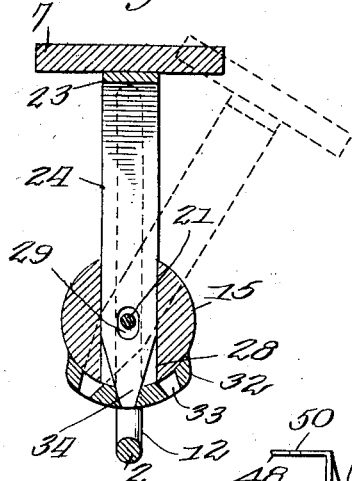
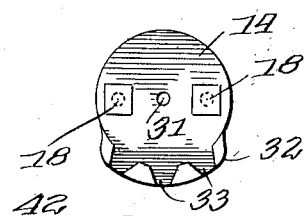
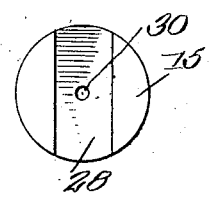
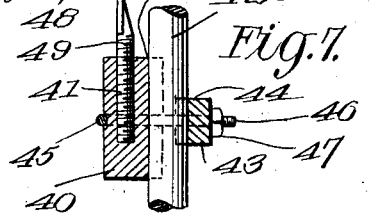
WITNESSES
INVENTOR
JOSEPH P. BRADFORD.
BY
ATTORNEYS

UNITED STATES PATENT OFFICE.

JOSEPH P. BRADFORD, OF JASPER, MISSOURI.

PLANTER ATTACHMENT FOR CULTIVATORS.

1,037,724.   Specification of Letters Patent.   Patented Sept. 3, 1912.

Application filed November 1, 1911. Serial No. 657,957.

*To all whom it may concern:*

Be it known that I, JOSEPH P. BRADFORD, a citizen of the United States, and a resident of Jasper, in the county of Jasper, State of Missouri, have invented a new and useful Improvement in Planter Attachments for Cultivators, of which the following is a specification.

My invention is an improvement in planter attachment for cultivators, and has for its object the provision of a simple, inexpensive attachment for connecting the grain or seed box of the planter with the axle, to permit of a variety of adjustments of the box with respect to the planter, and which may be applied to existing planters with but slight changes.

In the drawings: Figure 1 is a rear view of a part of the machine showing the improvement; Fig. 2 is an enlarged partial vertical section of the clamping device and holding plate; Fig. 3 is a section on the line 3—3 of Fig. 2; Fig. 4 is a section on the line 4—4 of Fig. 2; Fig. 5 is a front view of the central portion of the clamping device; Fig. 6 is a similar view of the outer portion; and Fig. 7 is a side view partly in section of a modified form.

In the present embodiment of the invention the axle 1 of the planter is provided with a spindle 2 offset vertically downward from the axle, and wheels 3 and 3ª are journaled on the respective spindles and are held in place by pins 4. The grain box 5 is supported by blocks 6 on a plate 7 which is supported above the axle in a manner to be described. A shaft 8 is journaled in the blocks 6, and a sprocket wheel 9 is secured to the outer end of the shaft. A chain 10 connects the wheel 9 with a sprocket wheel 11 on the adjacent wheel 3ª. Each of the spindles 2 is connected to the body of the axle by a vertical portion 12, and an adjusting and clamping device for the plate 7 is connected to that portion 12 adjacent to wheel 3ª. The said device consists of a three part clamp composed of blocks 13, 14 and 15. The first named block 13 is square and is of wood or the like and is arranged on the inner side of portion 12 and is grooved transversely, as indicated at 16, to receive the said portion 12 of the axle. The blocks 14 and 15 are cylindrical in form, and the block 14 is grooved, as indicated at 17, to register with the groove 16, and is clamped to the block 13 by means of bolts 18 passed from the outer face of block 14 through both blocks and engaged by nuts 19. The adjacent face of block 14 is countersunk to receive the heads of bolts 18, as indicated at 20, and a bolt 21 is passed from the groove 17 through blocks 14 and 15 and is engaged by a nut 22. The block 14 is countersunk to receive the head of bolt 21, and the said bolt clamps the blocks 14 and 15 together. An angle plate 23—24 connects the plate 7 to the clamping device. The portion 23 of the said plate is provided with an opening for receiving a bolt 25, and the bolt passes through the opening and through a slot 26 in the plate 7 and is engaged by a nut 27. The portion 24 of the angle plate is received in a groove 28 in the inner face of the block 15, and the said portion 24 is slotted at 29 to permit the passage of bolt 21, which passes through an opening 30 in the block 15, and an opening 31 in the block 14 (Figs. 5 and 6). The block 15 is rotatable on bolt 21 when nut 22 is loosened, and block 14 is provided with an arc-shaped downward extension 32 having a plurality of spaced notches 33. The lower end of portion 24 of the angle plate is pointed, as shown at 34, and the notches 33 are shaped to fit the said point. The slot 29 is of sufficient length to permit the portion 24 of plate 23—24 to be moved upward to clear the notches 33, and when the plate is so lifted with nut 22 loosened the block 15 may be rotated on bolt 21 to engage the point 34 with either of the notches 33. In this manner the plate 7 may be adjusted forwardly or rearwardly and may be held firmly in either position. The block 14 cannot rotate on block 13, and when the point 34 is engaged with a notch the block 15 cannot rotate on block 14.

By means of bolt 25 and slot 26 the seed box may be adjusted longitudinally merely by loosening nut 27. The box is thus capable of any desired adjustment with respect to the teeth 35 and without disarranging the connection between the shaft 8 and wheel 11.

The attachment may be applied to existing planters, since no radical changes are required in their structure. The clamping attachment requires no change in the axle, and the entire device is supported by the said clamping attachment. The said attachment may also be adjusted vertically on the axle, thus providing for a vertical adjustment of the grain box.

In the construction shown in Fig. 7, the attachment consists of a block 40, provided in its upper end with a vertical threaded opening 41, extending somewhat more than one-half the length of the block. The block is also provided with a vertical groove 42, on its inner face in which fits the vertical portion 12$^a$ of the axle. A block 43 is arranged on the opposite side of the said vertical portion, and is provided with a vertical groove 44, in which the said portion 12$^a$ fits. A stirrup or hanger comprising a body 45 and arms 46 is provided for clamping the blocks 40 and 43 on the portion 12$^a$, the body 45 of the stirrup extending across the block 40, and the arms 46 extending alongside the blocks and the portion 12$^a$. Each arm is engaged by a nut 47, and the said arms 46 may pass through openings in the blocks, if desired. The plate 7 upon which the grain box rests is connected to one arm 48 of an angular bracket, whose other arm 49 is threaded into the opening 41 of the block 40. The arm 48 is provided with an opening 50 for receiving a bolt similar to the bolt 25 in Fig. 1. With the construction just described, the blocks 40 and 43 may be adjusted vertically on the portion 12$^a$ of the axle by loosening the nuts 47.

I claim:—

1. In combination with the axle and the seed box of a cultivator, of a plate for supporting the box, blocks between the plate and the box, an operating shaft for the box journaled in the blocks, a driving connection for connecting the said shaft to a wheel on the axle an angle plate having one arm vertical and the other horizontal, said plate having a longitudinal slot at one end, a bolt passing through the horizontal arm and the slot of the plate, and an adjustable clamping device for the other arm of the angle plate, said device comprising blocks for engaging the opposite sides of the axle, said blocks being grooved on their inner faces, the grooves registering, and means for clamping the blocks together, said means comprising a stirrup consisting of a body and arms, the arms being threaded, nuts engaging the arms, one of said blocks having a vertical threaded opening in its upper end, the adjacent arm of the angle plate being threaded for engaging the opening.

2. In a cultivator, the combination with the seed box and the plate for supporting the the same, of an angle plate, an adjustable sliding connection between one arm of the angle plate and one end of the supporting plate, and a clamping device for connecting the other arm of the angle plate to the cultivator, said device comprising blocks for engaging the opposite sides of the cultivator axle, said blocks being grooved on their inner faces and the grooves registering, and means for clamping the blocks together, said means comprising a stirrup consisting of a body and arms, the arms being threaded and nuts engaging the arms.

3. In a cultivator, the combination with the seed box and the plate for supporting same, of an angle plate, an adjustable sliding connection between one arm of the angle plate and one end of the supporting plate, and a clamping device for connecting the other arm of the angle plate to the cultivator, said device comprising blocks for engaging the opposite sides of the cultivator axle, said blocks being grooved on their inner faces and the grooves registering, and means for clamping the blocks together.

4. In a cultivator, the combination with the seed box and the plate for suporting the same, of an angle plate, an adjustable sliding connection between one arm of the angle plate and one end of the supporting plate, and a clamping device for connecting the other arm of the angle plate to the cultivator, said device comprising blocks for engaging the opposite sides of the cultivator axle, said blocks being grooved on their inner faces and the grooves registering, and means for clamping the blocks together, said means comprising a stirrup consisting of a body and arms, the arms being threaded and nuts engaging the arms, one of said blocks having a vertical threaded opening in its upper end, the adjacent arm of the angle plate being threaded for engaging the opening.

JOSEPH P. BRADFORD.

Witnesses:
J. Wesley Spaid,
W. C. Thomas.

Copies of this patent may be obtained for five cents each, by addressing the "Commissioner of Patents, Washington, D. C."